(12) United States Patent
Kanaya et al.

(10) Patent No.: US 8,102,498 B2
(45) Date of Patent: Jan. 24, 2012

(54) LIQUID CRYSTAL DISPLAY DEVICE

(75) Inventors: Yasuhiro Kanaya, Tokyo (JP); Keiichi Yagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 12/545,920

(22) Filed: Aug. 24, 2009

(65) Prior Publication Data

US 2010/0053529 A1    Mar. 4, 2010

(30) Foreign Application Priority Data

Aug. 27, 2008  (JP) ................................. 2008-217637

(51) Int. Cl.
*G02F 1/1339*   (2006.01)
*G02F 1/1333*   (2006.01)
*G02F 1/1343*   (2006.01)

(52) U.S. Cl. ........ 349/155; 349/156; 349/153; 359/603; 359/604; 345/174; 216/24

(58) Field of Classification Search .................. 349/114, 349/155, 156, 153; 359/603, 604; 345/174
See application file for complete search history.

(56) References Cited

U.S. PATENT DOCUMENTS

| | | | | |
|---|---|---|---|---|
| 7,133,110 B2 * | 11/2006 | Sasaki et al. | | 349/156 |
| 7,525,631 B2 * | 4/2009 | Lee et al. | | 349/156 |
| 7,697,107 B2 * | 4/2010 | Song | | 349/158 |
| 2001/0019372 A1 * | 9/2001 | Ootsu et al. | | 349/38 |
| 2007/0002261 A1 * | 1/2007 | Lee et al. | | 349/155 |
| 2007/0139604 A1 * | 6/2007 | Paik et al. | | 349/156 |
| 2008/0007687 A1 * | 1/2008 | Konno | | 349/156 |
| 2008/0013023 A1 * | 1/2008 | Ochiai et al. | | 349/114 |

FOREIGN PATENT DOCUMENTS

| | | |
|---|---|---|
| JP | 2003-121859 | 4/2003 |
| JP | 2007-334003 | 12/2007 |
| JP | 2008-020753 | 1/2008 |
| JP | 2008-157997 | 7/2008 |
| JP | 2008-170589 | 7/2008 |
| JP | 2009-300648 | 12/2009 |

OTHER PUBLICATIONS

Japanese Patent Office Action corresponding to Japanese Serial No. 2008-217637 dated Jun. 15, 2010.

* cited by examiner

*Primary Examiner* — David Nelms
*Assistant Examiner* — Sang Nguyen
(74) *Attorney, Agent, or Firm* — SNR Denton US LLP

(57) ABSTRACT

The present invention provides a liquid crystal display device realizing improved reliability by preventing occurrence of a pixel defect. A liquid crystal display includes first and second substrates. A spacer maintains a distance between the first and second glass substrates. A liquid crystal layer is provided between the first and second substrates. A pixel electrode film and a common electrode film are formed over a base insulation film of the first substrate so as to sandwich a pixel insulation film in between. The common electrode film, the pixel electrode film or both of them are partly removed in a region corresponding to the spacer, and the pixel insulation film is partly removed in that region. It prevents the film structure from being broken due to deformation of the base insulation film made of a soft material caused by a pressure applied onto the spacer.

4 Claims, 12 Drawing Sheets

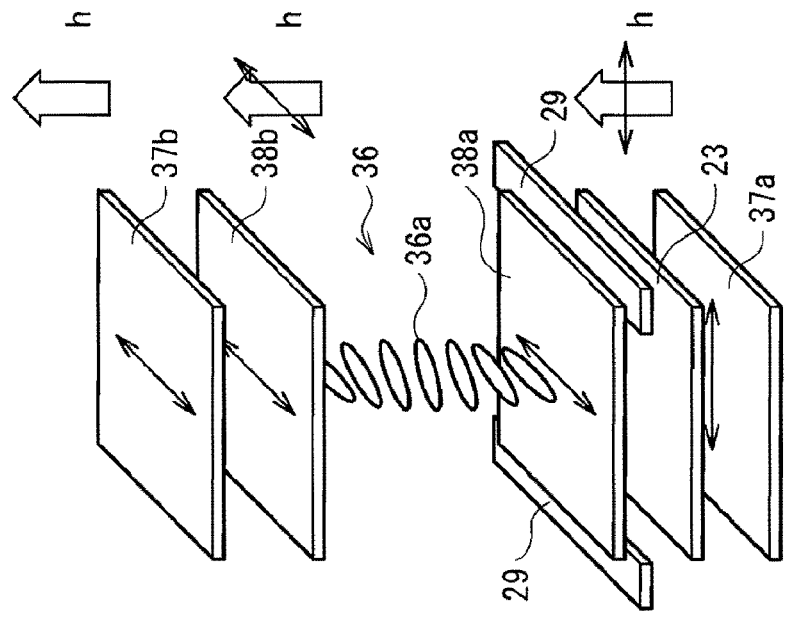
FIG. 4B  WHEN VOLTAGE IS APPLIED (WHITE)
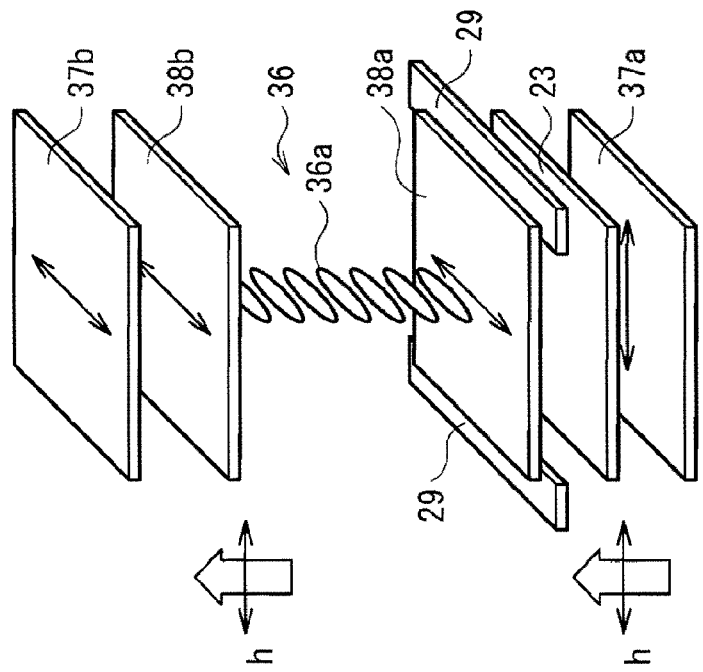
FIG. 4A  WHEN VOLTAGE IS NOT APPLIED (BLACK)

LIQUID CRYSTAL DISPLAY DEVICE

BACKGROUND OF THE INVENTION

1. Field of the Invention

The present invention relates to a liquid crystal display device which performs display by liquid crystal in the transverse electric field mode.

2. Description of the Related Art

One of types of a liquid crystal display device uses liquid crystal in the transverse electric field mode such as an FFS (Fringe Field Switching) mode. FIG. 11 illustrates a partly-enlarged sectional part in a liquid crystal display device 100 in the FFS mode. The liquid crystal display device 100 in the FFS mode is provided with two glass substrates 101a and 101b structuring a liquid crystal display panel. A spacer 102 determining the distance between the glass substrates 101a and 101b is disposed between the glass substrates 101a and 101b. A thin film transistor 103 is formed on a side of the glass substrate 101a. On the thin film transistor 103, an interlayer insulation film 104 for flattening the roughness is formed by an organic film or the like. On the interlayer insulation film 104, a common electrode film 105 and a pixel insulting film 106 are sequentially stacked and, further, a pixel electrode film 107 having a slit-shaped gap is stacked thereon. A liquid crystal layer 108 is disposed between the pixel electrode film 107 and the glass substrate 101b. Such a liquid crystal display device 100 is disclosed in Japanese Unexamined Patent Application Publication No. 2008-20753.

SUMMARY OF THE INVENTION

As described above, in the liquid crystal display device, the spacer is disposed on the inside or outside of a pixel. However, for example, in the case of disposing the spacer in the pixel, no concrete consideration is being made with respect to an appropriate position in the pixel for disposing the spacer, a suitable structure for disposing the spacer, and the like.

FIG. 11 illustrates an example of the case where the spacer is disposed in the pixel. When a force of pressing a screen of the liquid crystal display device having such a structure is applied, the force is transmitted to the spacer 102 and further to the pixel electrode film 107, the pixel insulating film 106, and the common electrode film 105 below the spacer 102. The pixel electrode film 107 and the common electrode film 105 are often made of a hard material such as indium oxide, and the pixel insulating film 106 is also often made of a hard material such as SiN (silicon nitride). In contrast, the interlayer insulation film 104 below the common electrode film 105 is often made of an organic material such as acrylic resin and is soft and easily deformed. Therefore, when a relatively large force is applied to the spacer 102, for example, as illustrated in FIG. 12, the interlayer insulation film 104 is deformed in a part below the spacer 102 and, simultaneously, a crack occurs in the pixel electrode film 107, the pixel insulation film 106, and the common electrode film 105. In some cases, they may break completely. In this case, the pixel electrode film 107 and the common electrode film 105 are short-circuited via a part of the broken pixel electrode film 107 or common electrode film 105, and a pixel defect occurs in the liquid crystal display device 100. In particular, such a problem becomes conspicuous when the pixel insulation film 106 is thinned to increase the electric field of the pixel.

Moreover, a liquid crystal display device having not only a display function but also an image pickup function is proposed recently. However, in the liquid crystal display device having the image pickup function of this kind in particular, the screen is frequently touched with a finger or the like. Therefore, the possibility that the problem of occurrence of the pixel defect due to pressure application to the screen occurs is high.

It is therefore desirable to provide a liquid crystal display device capable of realizing improved reliability by preventing occurrence of a pixel defect caused by pressure application to a screen.

A liquid crystal display device according to an embodiment of the present invention includes: a first substrate having a common electrode film formed on a base insulation film and a pixel electrode film formed over the common electrode film via a pixel insulation film; a second substrate disposed on a side of the pixel electrode film so as to face the first substrate; a liquid crystal layer provided between the first substrate and the second substrate; and a spacer defining a distance between the first and second substrates, wherein the common electrode film, the pixel electrode film or both of them are partly removed in a region corresponding to the spacer, and the pixel insulation film is partly removed in the region corresponding to the spacer.

In the liquid crystal display device according to the embodiment of the present invention, when a force is applied to the second substrate, the spacer is pushed toward a side of the first substrate by the force. In the region corresponding to the spacer, the common electrode film, the pixel electrode film or both of them are partly removed, and the pixel insulation film is partly removed in the region corresponding to the spacer. Therefore, occurrence of a crack due to press by the spacer is suppressed. Even if the crack occurs, short-circuiting does not occur between the common electrode film and the pixel electrode film.

In the liquid crystal display device according to the embodiment of the present invention, the common electrode film, the pixel electrode film or both of them are partly removed in the region corresponding to the spacer, and the pixel insulation film is partly removed in the region corresponding to the spacer. Thus, the short-circuiting between electrodes caused by the occurrence of the crack is avoidable. Therefore, the occurrence of the pixel defect due to pressure on the screen is prevented, and reliability is ensured.

Other and further objects, features and advantages of the invention will appear more fully from the following description.

BRIEF DESCRIPTION OF THE DRAWINGS

FIGS. 4A and 4B are perspective views illustrating a configuration of a main part of the liquid crystal display device.

DETAILED DESCRIPTION OF THE PREFERRED EMBODIMENTS

Embodiments of the present invention will be described in detail hereinbelow with reference to the drawings.

First Embodiment

Figure 1:
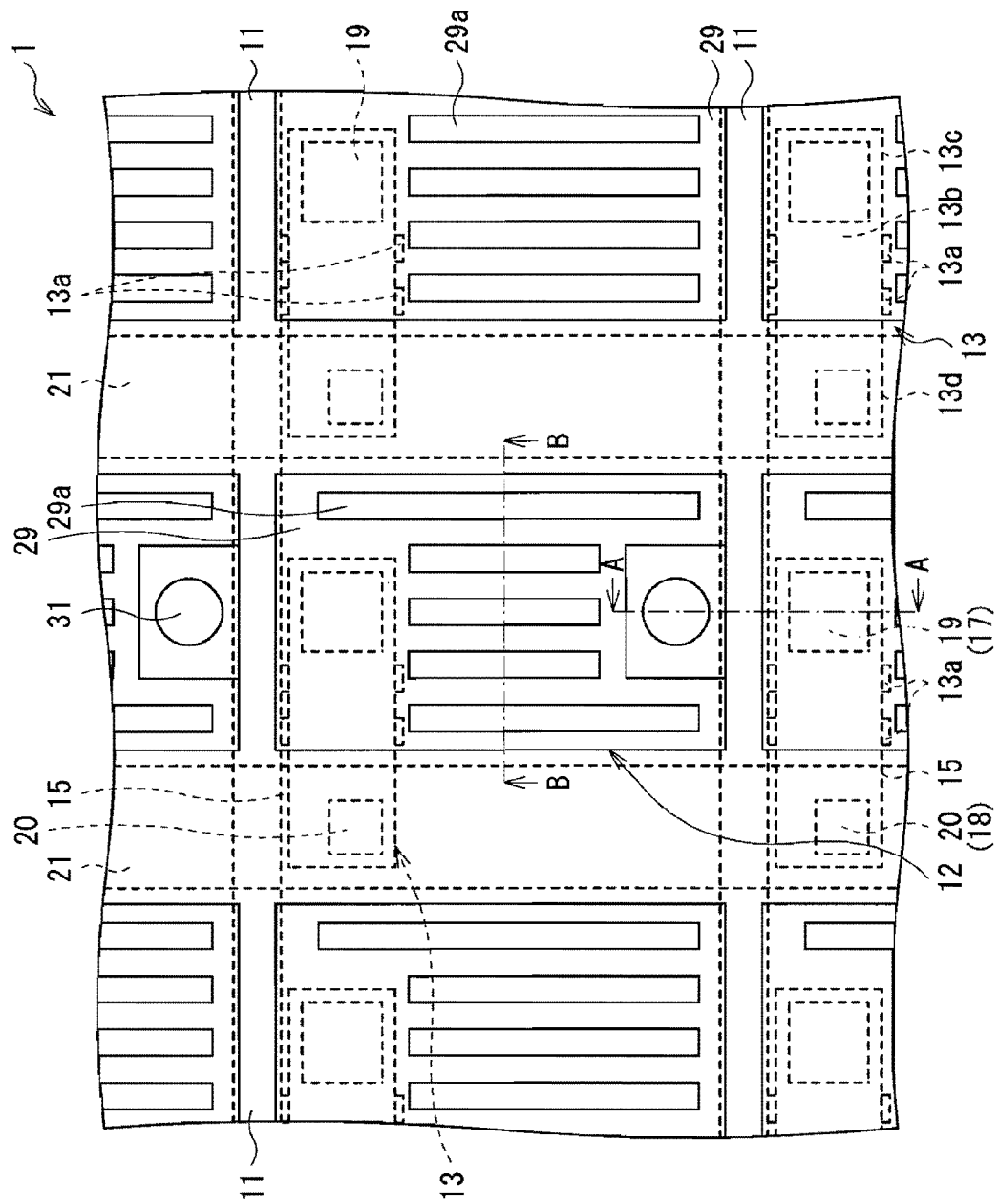
FIG. 1 is a plan view illustrating a structure of a main part of a liquid crystal display device according to a first embodiment of the present invention.
Figure 2:
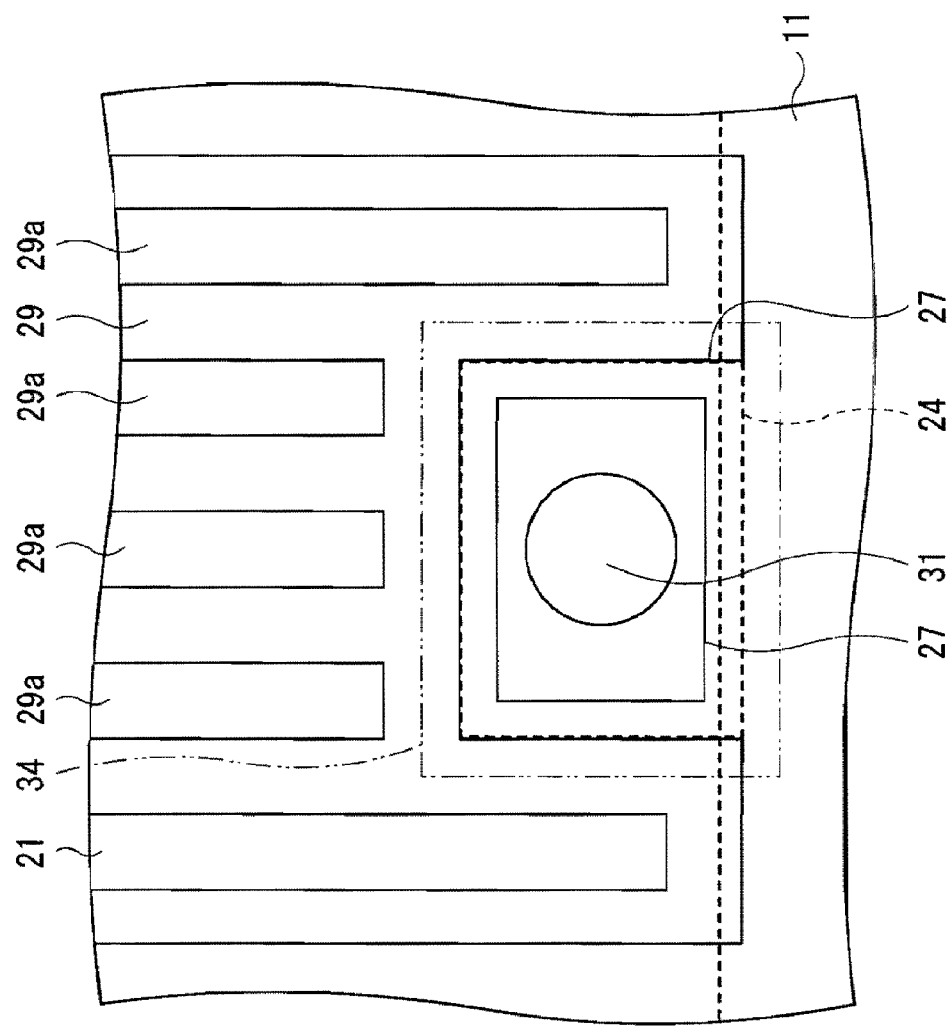
FIG. 2 is an enlarged view of a spacer part in FIG. 1.
Figure 3:
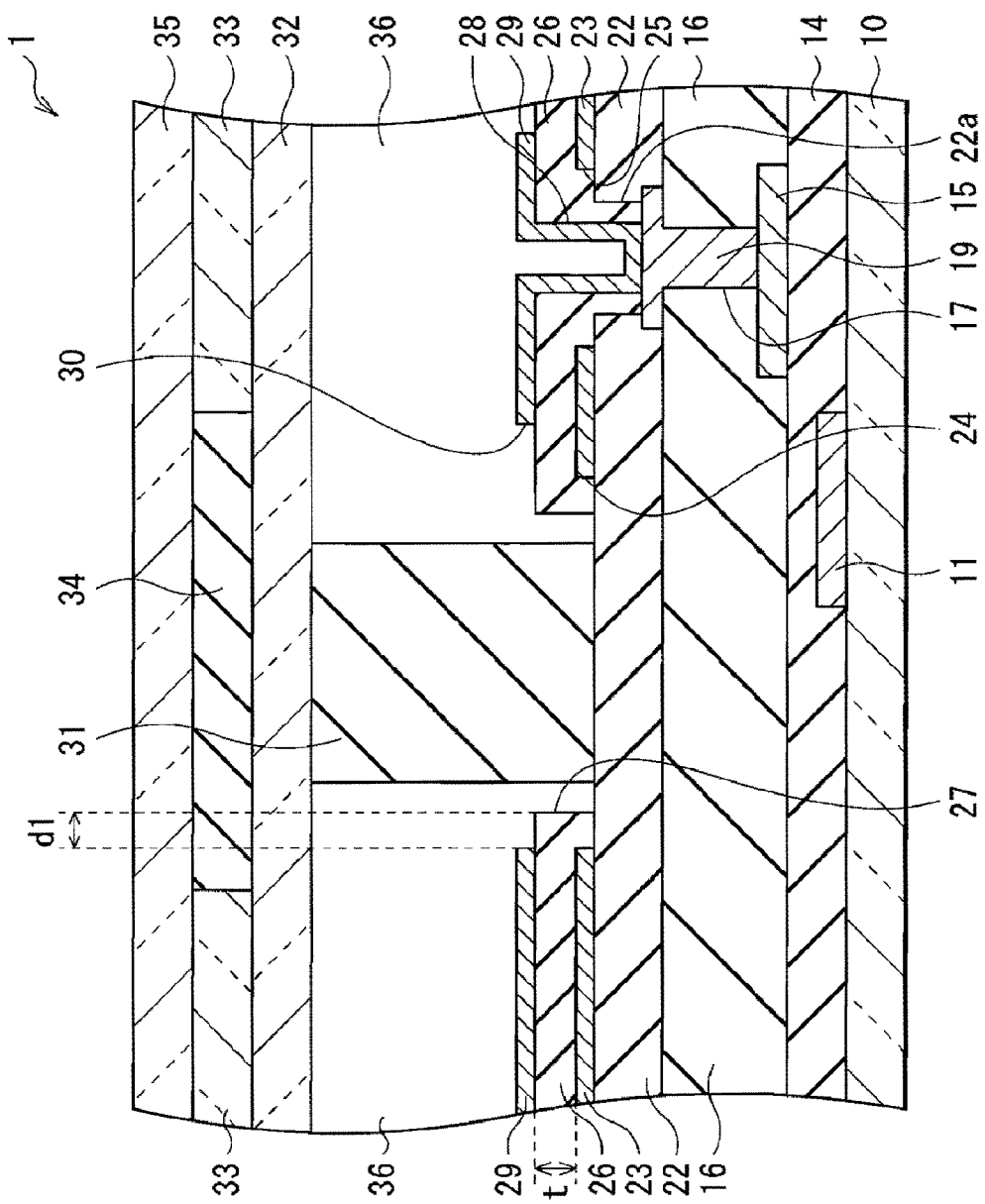
FIG. 3 is a cross section taken along line A-A in FIG. 1.

FIG. 1 is a plan view illustrating a configuration of a main part of a liquid crystal display device 1 according to a first embodiment of the present invention. FIG. 2 is an enlarged view of a spacer part in FIG. 1. FIG. 3 is a cross section taken along line A-A in FIG. 1. FIGS. 1 and 2 illustrate a state where the components above a liquid crystal layer 36 are eliminated.

As illustrated in FIG. 3, the liquid crystal display device 1 includes a first glass substrate 10 as one concrete example of a "first substrate" of the present invention, and a second glass substrate 35 as one concrete example of a "second substrate" of the present invention. A spacer 31 for maintaining a distance between the first glass substrate 10 and the second glass substrate 35, is disposed between the first glass substrate 10 and the second glass substrate 35. On a side of the first glass substrate 10, a pixel electrode film 29 and a common electrode film 23 formed so as to sandwich a pixel insulation film 26 are provided. The liquid crystal layer 36 is disposed between the first glass substrate 10 and the second glass substrate 35.

The detailed configuration of the liquid crystal display device 1 is as follows.

As illustrated in FIG. 3, a plurality of gate lines 11 as selection lines are extended in a row direction (a horizontal direction in FIG. 1) on a top face of the first glass substrate 10. In a region structuring one pixel 12, a gate 13a of a thin film transistor (TFT) 13 for driving the pixel 12 extends in a column direction (a vertical direction in FIG. 1) from the gate line 11. In the illustrated example, two gates 13a extend in parallel with each other, thereby establishing a so-called double data structure. On the top face of the first glass substrate 10, a gate insulting film 14 is provided so as to cover the gate lines 11 and the gates 13a.

On a top face of the gate insulating film 14, as illustrated in FIG. 3, a semiconductor layer 15 serving as an active layer of the TFT 13 is provided. In the present embodiment, the semiconductor layer 15 extends long in the row direction (FIG. 1). A region in which the semiconductor layer 15 and the gate 13a are crossed in the semiconductor layer 15 serves as a channel of the TFT 13. On the gate insulting film 14, a transistor protection film 16 having insulating properties for protecting the TFT 13 is provided so as to cover the semiconductor layer 15. The transistor protection film 16 is a hard film made of, for example, SiN or the like. Therefore, the transistor protection film 16 is not deformed even when force is applied.

In the transistor protection film 16, a first contact hole 17 is provided on a side of one end (a source 13c) of the semiconductor layer 15, and a second contact hole 18 is provided on a side of the other end (a drain 13d) of the semiconductor layer 15 (FIG. 1). The first contact hole 17 is filled with a conductor, thereby forming a first contact 19 electrically connected to the semiconductor layer 15. Also, the second contact hole 18 is filled with a conductor, thereby forming a second contact 20 (FIG. 1) electrically connected to the semiconductor layer 15. The first contact 19 electrically connects the source 13c of the TFT 13 and the pixel electrode film 29. The second contact 20 electrically connects a data line 21 extending in the column direction above the transistor protection film 16 and the drain 13d of the TFT 13. A data signal (pixel voltage) is supplied from the data line 21 to the TFT 13 via the second contact 20. The data signal is supplied from the source 13c of the TFT 13 to the pixel electrode film 29 via the drain 13d and the first contact 19 when the TFT 13 is in the on state.

Over the transistor protection film 16, the first contact 19, and the second contact 20, an interlayer insulation film 22 is provided so as to cover them. The interlayer insulation film 22 is made of an organic material such as acrylic resin and is therefore easily deformed. In a position in which the first contact 19 is formed in the interlayer insulation film 22, an interlayer insulation film contact hole 22a reaching a top face of the first contact 19 is formed. The interlayer insulation film 22 corresponds to one concrete example of a "base insulation layer" of the present invention.

On a top face of the interlayer insulation film 22, the common electrode film 23 is provided. In the common electrode film 23, a rectangular-shaped common electrode film hole 24 and a common electrode film contact hole 25 are formed. The common electrode film hole 24 is larger than a size of the spacer 31 in plan view. The common electrode film contact hole 25 is provided in a position where it overlaps the first contact 19 in plan view, and its size in plan view is larger than the interlayer insulation film contact hole 22a, to prevent short-circuit between the common electrode film 23 and the pixel electrode film 29.

On a top face of the common electrode film 23, the pixel insulation film 26 is provided. In the pixel insulation film 26, a pixel insulation film hole 27 is formed in a position corresponding to the spacer 31, and a pixel insulation film contact hole 28 is formed in a position corresponding to the first contact 19. The pixel insulation film hole 27 is larger than the size of the spacer 31 and smaller than the size of the common electrode film hole 24 in plan view. The pixel insulation film hole 27 is provided in a position corresponding to the common electrode film hole 24.

On the pixel insulation film 26, a pixel electrode film 29 is formed for each of the pixels 12. As illustrated in FIG. 1, the pixel electrode film 29 is disposed so as to overlap any of the gate lines 11 and extend across two neighboring gate lines 11. In the pixel electrode 29, the pixel electrode film hole 30 (FIG. 3) is formed in a position corresponding to the pixel insulation film hole 27 and the common electrode film hole 24. The pixel electrode film hole 30 has a size equivalent to that of the common electrode film hole 24 and is, therefore, larger than the size of the spacer 31 in plan view. The pixel electrode film 29 is formed so as to cover an inner face of the pixel insulation film contact hole 28, and is in contact with the first contact 19 at the bottom of the hole. As a result, the drain 13d of the TFT 13 and the pixel electrode film 29 are electrically connected to each other via the first contact 19. A plurality of elongated openings (slits 29a) extending in the column direction are formed in the pixel electrode film 29.

When a distance from an edge of the common electrode film hole 24 or the pixel electrode film hole 30 to an edge of the pixel insulation film hole 27 is "d1", and a thickness of the pixel insulation film 26 is "t", a relationship of d1>t is satisfied. By setting such a relationship, the electric field generated between the common electrode film 23 and the pixel electrode film 29 is prevented from becoming stronger only around the spacer 31.

On an under face of the second glass substrate 35, a layer of a color filter 33 and a black matrix 34, and a planarization layer 32 are stacked in order. Below the black matrix 34, the spacer 31 made of resist for example is provided. A lower end face of the spacer 31 is in contact with the top face of the interlayer insulation film 22 exposed in a region corresponding to the common electrode film hole 24, the pixel insulation film hole 27, and the pixel electrode film hole 30 on the side of the first glass substrate 10. As illustrated in FIGS. 2 and 3, the black matrix 34 is formed slightly larger than the pixel electrode film hole 30. The black matrix 34 is formed so as to separate the neighboring color filters 33 to prevent color mixture. The liquid crystal layer 36 is provided between a stacked structure on the side of the second glass substrate 35 and a stacked structure on the side of the first glass substrate 10. The spacer 31 penetrates the liquid crystal layer 36, and functions to maintain a predetermined distance between the stacked structure on the first glass substrate 10 side and the stacked structure on the second glass substrate 35 side. The spacer 31 may be provided for all of pixels or for only a part of the pixels. In the case of providing the spacer 31 only a part of the pixels, it is preferable that the spacers 31 be provided, for example, to pixels for blue, since in the pixels for blue, the influence is little from the viewpoint of visibility characteristic even when the transmission light amount is decreased due to the arrangement of the spacers.

FIGS. 4A and 4B schematically illustrate a perspective structure of the liquid crystal display device. As illustrated in the drawings, a first alignment film 38a, the liquid crystal layer 36, a second alignment film 38b, and a second polarizer 37b are disposed on a side of the top face (light outgoing side) of the pixel electrode film 29. In addition, a first polarizer 37a is disposed on a side of the under face (light incident side) of the glass substrate (common electrode film 23).

[Manufacturing Method]

The liquid crystal display device 1 having such a configuration is manufactured, for example, in the following manner. First, a metal film is formed on the first glass substrate 10 to form the gate lines 11 and the gates 13a of the TFTs 13 for driving the pixels 12 of the liquid crystal display device 1. The metal film may be formed of a metal material such as molybdenum by using, for example, a film forming method such as sputtering. Then, a mask is formed on a top face of the metal film by using the photolithography technique. Thereafter, the metal film exposed from open parts in the mask is etched, and the mask is removed. In such a manner, the gate lines 11 and the gates 13a of the TFTs 13 are formed.

Next, the gate insulation film 14 covering the first glass substrate 10, the gate line 11, and the gate 13a of the TFT 13 is formed. The gate insulation film 14 is formed of an insulation material such as SiN by using the film forming method such as plasma-enhanced chemical vapor deposition (plasma CVD).

Next, the semiconductor layer 15 is formed. To form the semiconductor layer 15, first, a film of a semiconductor material such as amorphous silicon, which becomes the semiconductor layer 15, is formed on the top face of the gate insulation film 14 by using a film forming method such as plasma CVD. Then, a mask is formed on a top face of the semiconductor material by using the photolithography technique. Thereafter, the semiconductor material exposed from the open parts in the mask is etched, and the mask is removed. In such a manner, the semiconductor layer 15 is formed.

Next, the transistor protection film 16 protecting the TFT 13 is formed on the top face of the semiconductor layer 15 and on the top face of the gate insulation film 14. To form the transistor protection film 16, first, a film of an insulation material such as SiN is formed on the top face of the gate insulation film 14 by using a film forming method such as plasma CVD to cover the semiconductor layer 15. Then, a mask is formed on the top face of the gate insulation film 14 by using the photolithography technique, and the insulation material exposed from the open parts in the mask is etched, and thereafter, the mask is removed, such that the first contact hole 17 and the second contact hole 18 are disposed along a layer stack direction. In such a manner, the first contact hole 17 and the second contact hole 18 are formed in the transistor protection film 16.

Next, by filling the first contact hole 17 and the second contact hole 18 with the conductor, the first contact 19 and the second contact 20 are formed. Then, the data line 21 is formed. The data line 21 may be formed in a manner similar to that of the gate line 11.

Thereafter, the layer insulation film 22 is formed on the top faces of the transistor protection film 16, the first contact 19, and the data line 21, in such a manner that the layer insulation film 22 has a thickness of, for example, about 1.5 µm to 2 µm. The interlayer insulation film 22 may be formed by using an insulating material such as acrylic resin. In this case, when an acrylic resin having photosensitivity is used, the interlayer insulation film contact hole 22a is easily formed by using a photolithography technique. In such a manner, the interlayer insulation film 22 for bringing insulation between the first contact 19 and the common electrode film 23 is formed.

Then, the common electrode film 23 as a transparent electrode is formed on the interlayer insulation film 22, in such a manner that the common electrode film 23 has a thickness of about 0.05 µm to 0.1 µm. To form the common electrode film 23, first, a film of an electrode material such as indium oxide is formed on the top face of the interlayer insulation film 22 by using a film forming method such as sputtering. Then, to form the common electrode film hole 24 and the common electrode film contact hole 25, a mask is formed on the top face of the common electrode film 23 by using a photolithography technique, and the electrode material exposed from the open parts in the mask is etched, and thereafter, the mask is removed. In such a manner, the common electrode film 23 having the common electrode film hole 24 obtained by partly removing the region corresponding to the spacer 31 and the common electrode film contact hole 25 obtained by partly removing the region corresponding to the first contact 19 is formed.

Then, the pixel insulation film 26 having a thickness of about 0.1 µm to 0.2 µm is formed on the common electrode film 23. The pixel insulation film 26 is obtained by forming a film of, for example, a dielectric such as SiN on the top face of the common electrode film 23 by using a film formation method such as plasma CVD, forming a mask on a top face of the dielectric layer by using a photolithography technique, etching parts which are not covered with the mask, and removing the mask. In such a manner, the pixel insulation film 26 having the pixel insulation film hole 27 obtained by partly removing the region corresponding to the spacer 31 and the pixel insulation film contact hole 28 obtained by partly removing the region corresponding to the first contact 19 is formed.

Next, the pixel electrode film 29 is formed on the pixel insulation film 26, in such a manner that the pixel electrode film 29 has a thickness of about 0.05 µm to 0.1 µm. The pixel electrode film 29 is obtained by forming a film of an electrode material such as indium oxide by using a film forming method such as sputtering, forming a mask on a top face of the electrode material by using a photolithography technique, etching the part which is not covered with the mask, and removing the mask. In such a manner, the pixel electrode film 29 having the slit 29a for allowing the electric field to be applied between the pixel electrode film 29 and the common electrode film 23 via the pixel insulation film 26, and the pixel electrode film hole 30 obtained by partly removing the region corresponding to the spacer 31, is formed.

Meanwhile, the color filter 33, the black matrix 34, the planarization layer 32, and the spacer 31 are formed on the second glass substrate 35. First, the black matrix 34 is formed on the top face of the second glass substrate 35. The black matrix 34 is formed in the region corresponding to the spacer 31, that is, a part where the spacer 31 overlaps in plan view, regions where the contrast deteriorates when light transmits therethrough, and border regions between neighboring color parts in the color filter 33. Preferably, the black matrix 34 is formed larger than the pixel electrode film hole 30 or the common electrode film hole 24 by 4 μm or more on one side in the plane direction. The black matrix 34 is obtained by applying a negative resist of black on the top face of the second glass substrate 35, and performing exposure and development by using a photolithography technique. Thereby, the resist in the exposed part remains as the black matrix 34 on the top face of the second glass substrate 35. It is to be noted that a positive resist may be used for the black resist.

Next, the color filter 33 is formed on the top face of the second glass substrate 35. The color filters 33 are formed for each color of red, green, and blue. Specifically, the color filter 33 of red is obtained by applying a negative color resist of red on the top face of the second glass substrate 35, and performing exposure and development by using a photolithography technique. Then, the color filters 33 of green and blue are formed. The color filters 33 of green and blue may be formed by a method similar to that of the color filter 33 of red. The order of forming the color filter 33 of red, the color filter 33 of green, and the color filter 33 of blue is optional. As the color resist, a positive resist may be used.

Next, the planarization layer 32 is formed on the top faces of the black matrix 34 and the color filter 33. By forming the planarization layer 32 on the black matrix 34 and the color filter 33, the rough surface formed by the formation of the black matrix 34 and the color filter 33 is planarized.

Then, the spacer 31 is formed on a top face of the planarization layer 32. The spacer 31 is obtained by applying a negative resist on the top face of the planarization layer 32, and performing exposure and development by using a photolithography technique. In such a manner, the spacer 31 overlapping the black matrix 34 in plan view is formed. As the resist, a positive resist may be used.

Thereafter, the pixel electrode film 29 arranged on the side of the first glass substrate 10, and the spacer 31 arranged on the side of the second glass substrate 35, are disposed so as to face each other, and the first glass substrate 10 and the second glass substrate 35 are attached together. At this time, positioning is made so that the spacer 31 passes through the inside of the pixel electrode film hole 30, the pixel insulation film hole 27, and the common electrode film hole 24, and that the one end of the spacer 31 comes into contact with the interlayer insulation film 22.

Next, a liquid crystal is injected between the pixel electrode film 29 and the planarization layer 32 to form the liquid crystal layer 36. Thereby, the main manufacturing processes of the liquid crystal display device are completed.

[Operation and Action]

Figure 5A:
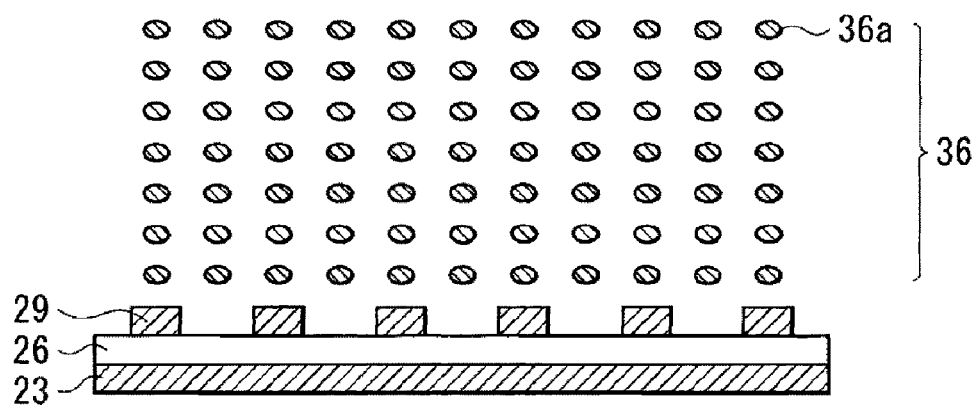
FIGS. 5A and 5B are cross sections taken along line B-B in FIG. 1.
Figure 5B:
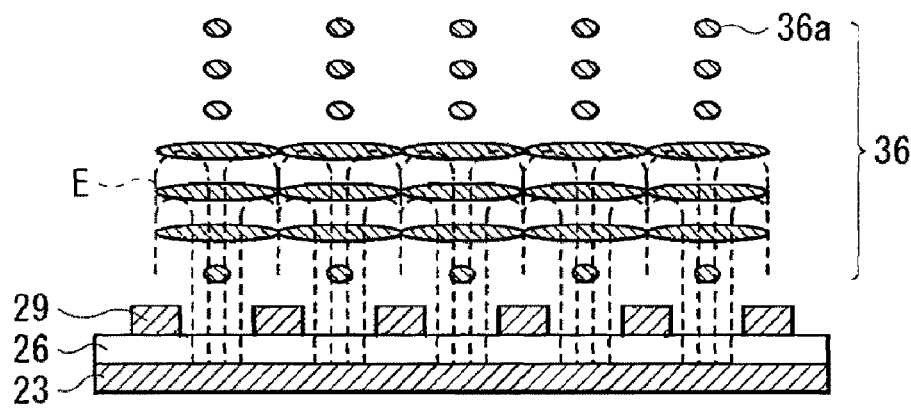

First, the basic operation of the liquid crystal display device 1 will be described. FIGS. 4A and 4B illustrate a perspective configuration of the liquid crystal display device 1, and FIGS. 5A and 5B illustrate cross sections of the liquid crystal display device 1 (cross sections taken along line B-B in FIG. 1). FIGS. 4A and 5A illustrate a state where no voltage is applied, and FIGS. 4B and 5B illustrate a state where voltage is applied.

To the liquid crystal display device 1, light is incident from a backlight (not illustrated) disposed on the rear side of the glass substrate (the lower side in FIG. 1). The light incident on the liquid crystal layer 36 is subjected to space modulation in the FFS mode described below when passing through the liquid crystal layer 36.

Specifically, as illustrated in FIGS. 4A and 5A, in a state where no voltage is applied between the common electrode film 23 and the pixel electrode film 29, axes of liquid crystal molecules 36a structuring the liquid crystal layer 36 are orthogonal to transmission axis of the first polarizer 37a on an incident side, and are parallel to transmission axis of the second polarizer 37b on a light outgoing side. Thus, the incident light "h" passing through the first polarizer 37a on the incident side reaches the second polarizer 37b on the outgoing side without causing a phase difference in the liquid crystal layer 36 and is absorbed thereby. Hence, black is displayed.

On the other hand, as illustrated in FIGS. 4B and 5B, in a state where voltage is applied across the common electrode film 23 and the pixel electrode film 29, an alignment direction of the liquid crystal molecules 36a is turned oblique to an extension direction of the pixel electrode film 29 by the electric field E generated between the pixel electrode films 29. At this time, the electric field intensity in white display is optimized to turn the liquid crystal molecules 36a positioned in the center in a thickness direction of the liquid crystal layer 36 by about 45 degrees. Thereby, the phase difference occurs in the incident light passed through the first polarizer 37a on the incident side when it passes through the liquid crystal layer 36. The light becomes linearly-polarized light turned by 90 degrees, and passes through the second polarizer 37b on the outgoing side. Hence, white is displayed.

A characteristic action of the liquid crystal display device 1 will now be described.

Figure 6:
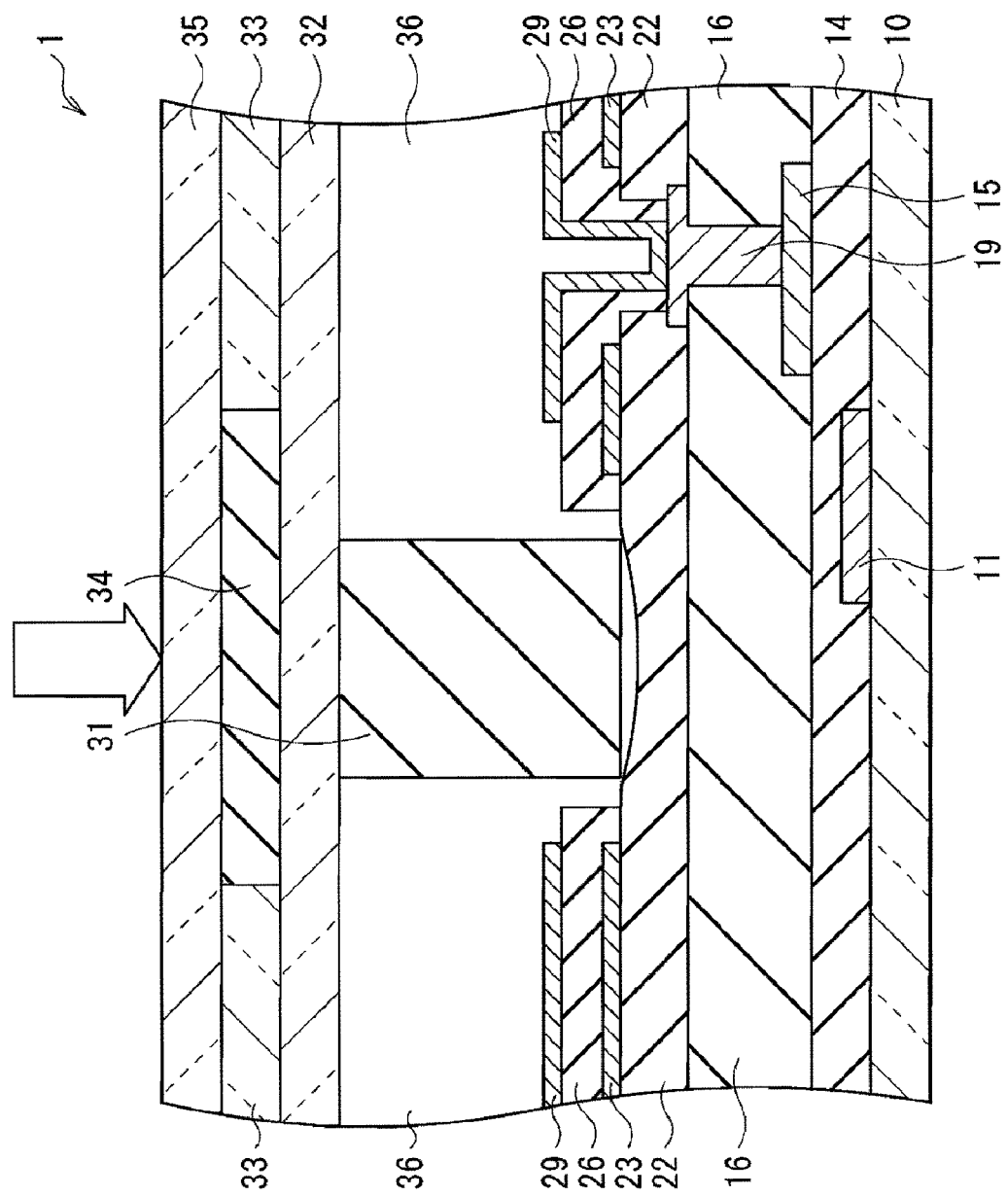
FIG. 6 is a cross section for explaining operation of the liquid crystal display device illustrated in FIG. 1.

FIG. 6 illustrates a sectional configuration of the liquid crystal display device 1. In FIG. 6, reference numerals are attached only to components necessary for the description, and are not attached to the other components. As illustrated by an arrow in FIG. 6, when a force is applied from the side of the second glass substrate 35 to the liquid crystal display device 1, a downward force is applied to the spacer 31, and the interlayer insulation film 22 disposed below the spacer 31 is deformed. Since no force is directly applied to the common electrode film 23, the pixel insulation film 26, and the pixel electrode film 29 at this time, a crack hardly occurs. Therefore, the common electrode film 23 and the pixel electrode film 29 are not short-circuited.

In the present embodiment, the common electrode film 23 and the pixel electrode film 29 are partly removed in the region corresponding to the spacer 31, and the pixel electrode film hole 30 and the common electrode film hole 24 are open. Thus, the electric field from the gate line 11 below them may leak into the liquid crystal layer 36 to influence the behavior of the liquid crystal molecules (not illustrated). As a result, the contrast may likely to deteriorate. In view of this possibility, in the present embodiment, the black matrix 34 is formed slightly larger than the pixel electrode film hole 30 to sufficiently ensure the light shield region around the spacer 31. Thereby, even if disturbance occurs in the electric field in the peripheral region of the spacer 31, no light passes through the region. Therefore, the disturbance of the electric field is prevented from contributing to deterioration in the contrast.

Accordingly, in the present embodiment, the common electrode film 23, the pixel insulation film 26, and the pixel electrode film 29 are removed in the position corresponding to the spacer 31, and one of the end faces of the spacer 31 is in contact with the interlayer insulation film 22. Thus, even when the second glass substrate 35 is strongly pressed or impact is applied to the liquid crystal display device 1, occurrence of short-circuit between the pixel electrode film 29 and the common electrode film 23 is avoided. Therefore, occurrence of a pixel defect is effectively prevented. As a result, reliability of the device and a period until a product defect occurs (product life) is increased. In addition, the occurrence of the pixel defect is able to be suppressed even when the pixel insulation film 26 is thinned. Therefore, reduction in thickness of the liquid crystal display panel is possible.

Hereinafter, other embodiments of the present invention will be described. In the following description of the embodiments, the same reference numerals are designated to the same components as those of the first embodiment and their detailed description will not be given or will be given briefly.

Second Embodiment

Figure 7:
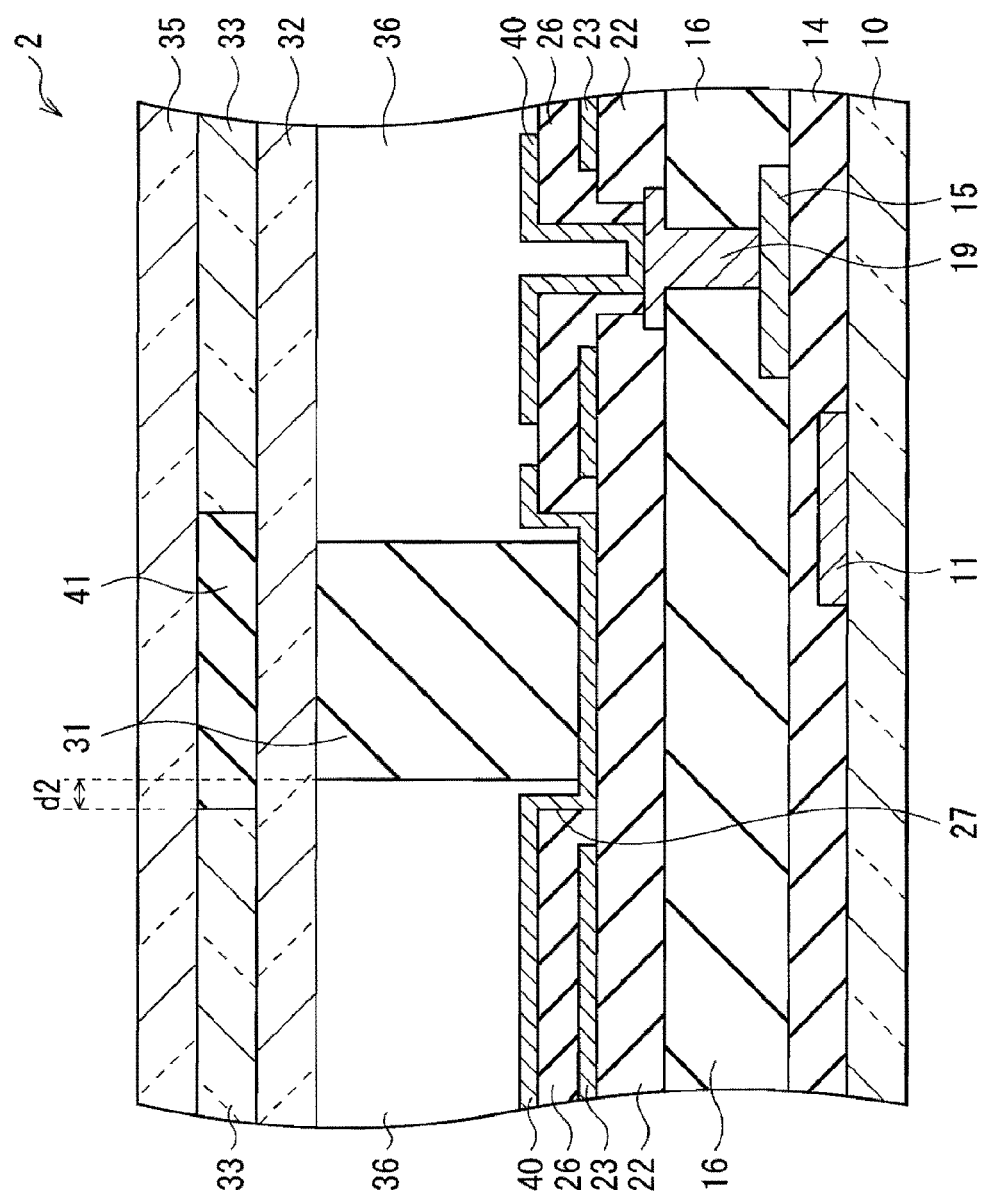
FIG. 7 is a cross section illustrating a structure of a main part of a liquid crystal display device according to a second embodiment.

FIG. 7 illustrates a sectional configuration of a main part in a liquid crystal display device 2 according to a second embodiment. The liquid crystal display device 2 is different from the liquid crystal display device 1 of the first embodiment, with respect to the configuration of a pixel electrode film 40 and a black matrix 41. Specifically, in the liquid crystal display device 2, a pixel electrode film hole is not provided in the pixel electrode film 40. As a result, the pixel electrode film 40 covers all of the part including the top face of the pixel insulation film 26 and an inner wall face and a bottom face of the pixel insulation film hole 27 (the top face of the interlayer insulation film 22 exposed from the pixel insulation film hole 27). In addition, one of end faces of the spacer 31 is in contact with the top face of the pixel electrode film 40 covering the bottom face of the pixel insulation film hole 27. The other configuration is similar to that of the first embodiment (FIG. 3).

Figure 8:
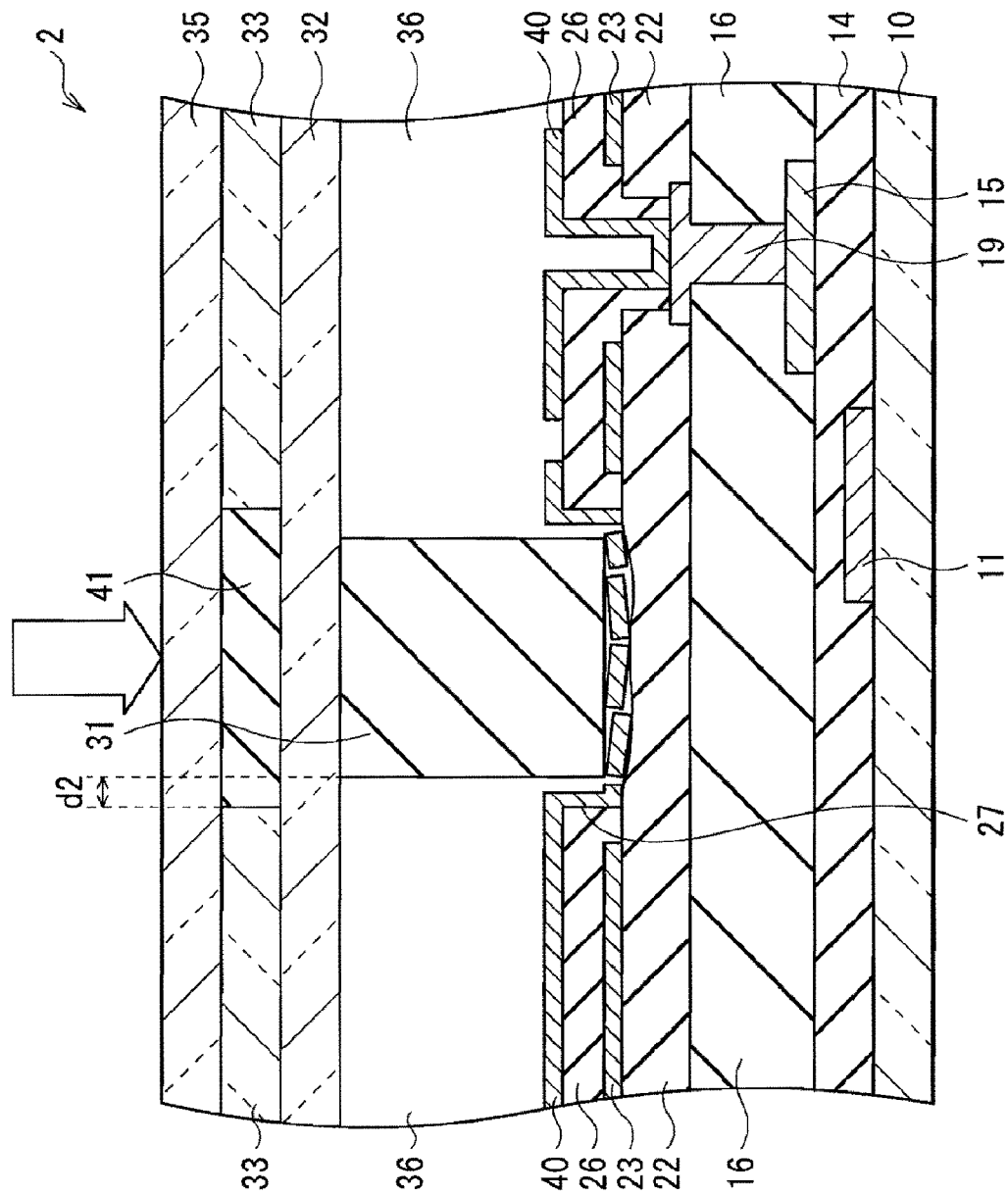
FIG. 8 is a cross section illustrating a state where a pixel electrode film in the liquid crystal display device illustrated in FIG. 7 is broken.

In the liquid crystal display device 2 having such a configuration, as illustrated in FIG. 8, when the second glass substrate 35 is pressed, the force is applied to the spacer 31, and the pixel electrode film 40 and the interlayer insulation film 22 below the pixel electrode film 40 are pressed. Since the interlayer insulation film 22 is made of a soft organic material, the interlayer insulation film 22 easily deforms by being pressed. Thereby, damage such as a crack may occur in the pixel electrode film 40. However, even if the crack occurs in the pixel electrode film 40, the pixel electrode film 40 and the common electrode film 23 are not short-circuited, since the common electrode film 23 does not exist below the spacer 31 and, moreover, the edge of the common electrode film hole 24 is completely covered with the pixel insulation film 26. Therefore, the occurrence of the pixel defect is suppressed.

Further, in the liquid crystal display device 2, the pixel electrode film hole 30 (FIG. 1) is not provided, and the pixel electrode film 40 completely covers the common electrode film hole 24. Thus, the electric field from the gate line 11 is effectively blocked by the pixel electrode film 40, and a field disturbance area of the periphery of the spacer 31 is reduced. Thereby, a size in plan view of the black matrix 41 disposed above the spacer 31 is able to be made smaller than that in the first embodiment. Specifically, a plane distance d2 from an end part of the spacer 31 to an end part of the black matrix 41 is able to be reduced. As a result, an area of the black matrix 41 and a region through which irradiation light from the unillustrated backlight passes increases (the numerical aperture increases). Therefore, deterioration in brightness is avoidable.

Accordingly, in the present embodiment, the occurrence of the pixel defect in the spacer part is effectively prevented, while avoiding both of the deterioration in brightness and the deterioration in contrast caused by the existence of the spacer 31.

Third Embodiment

Figure 9:
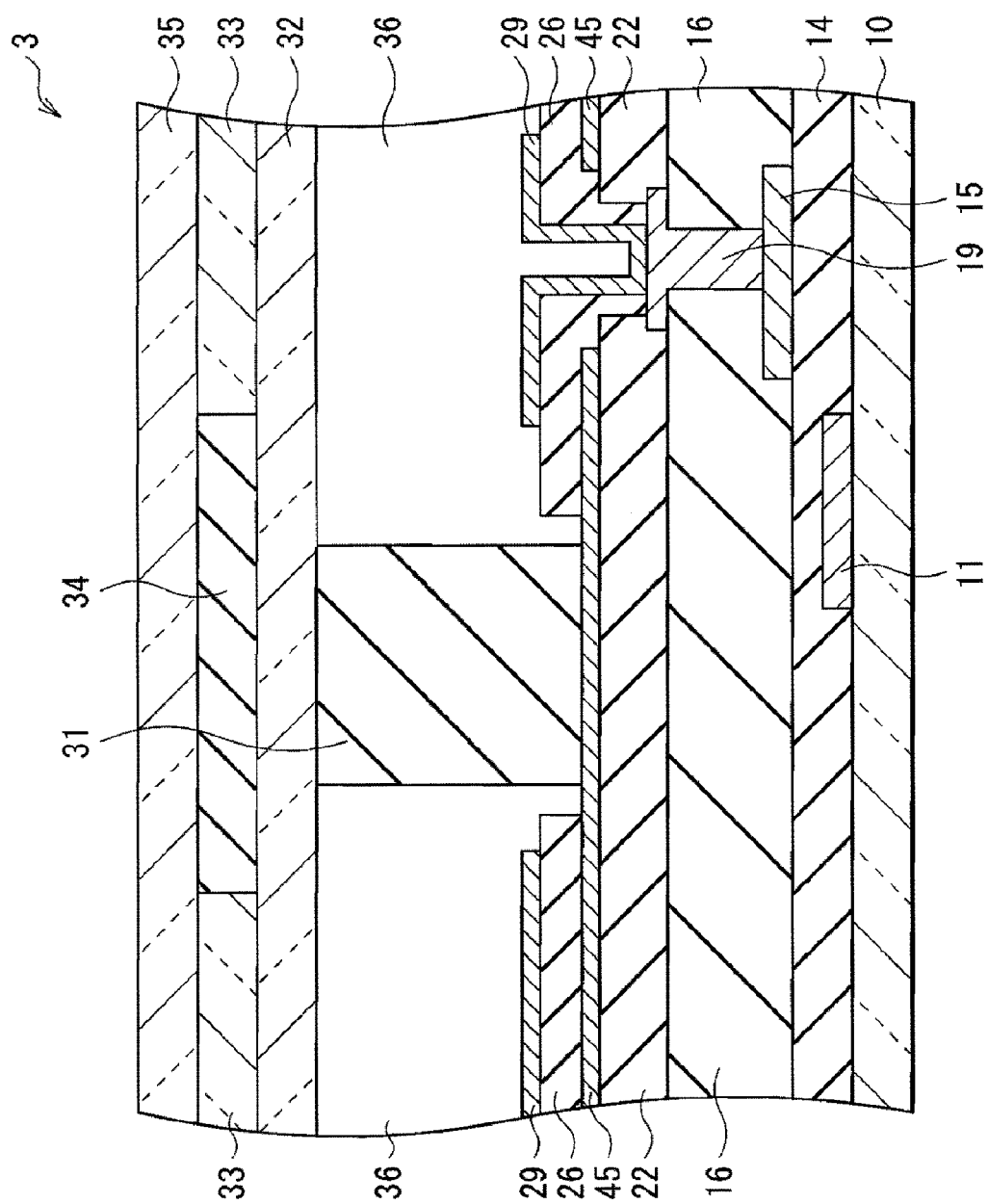
FIG. 9 is a cross section illustrating a structure of a main part of a liquid crystal display device according to a third embodiment.

FIG. 9 illustrates a sectional configuration of the spacer 31 portion in a liquid crystal display device 3 according to a third embodiment. The liquid crystal display device 3 is different from the liquid crystal display device 1 of the first embodiment, with respect to a common electrode film 45. Specifically, in the liquid crystal display device 3, the common electrode film hole 24 (FIG. 1) is not provided for the common electrode film 45. As a result, the common electrode film 45 is exposed from the bottom of the pixel insulation film hole 27. In addition, one of the end faces of the spacer 31 is in contact with a top face of the common electrode film 45 exposed at the bottom of the pixel insulation film hole 27. The other configuration is similar to that of the first embodiment (FIG. 3).

In the third embodiment, the pixel insulation film hole 27 and the pixel electrode film hole 30 are formed, and the pixel insulation film 26 and the pixel electrode film 29 are partly eliminated in the region corresponding to the spacer 31. On the other hand, the common electrode 23 is not removed but is left, and one of the end faces of the spacer 31 is in contact with the surface of the common electrode film 45. Thus, when pressure or impact is applied to the second glass substrate 35, the common electrode film 45 and the interlayer insulation film 22 below the common electrode film 45 are pressed by the spacer 31. Since the interlayer insulation film 22 is made of a soft organic material, the interlayer insulation film 22 deforms by being depressed, and damage such as the crack is likely to occur in the common electrode film 45. However, even when the common electrode film 45 is damaged, the short-circuit between the pixel electrode film 29 and the common electrode film 45 is less likely to occur. Therefore, the occurrence of the pixel defect is able to be prevented.

Fourth Embodiment

Figure 10:
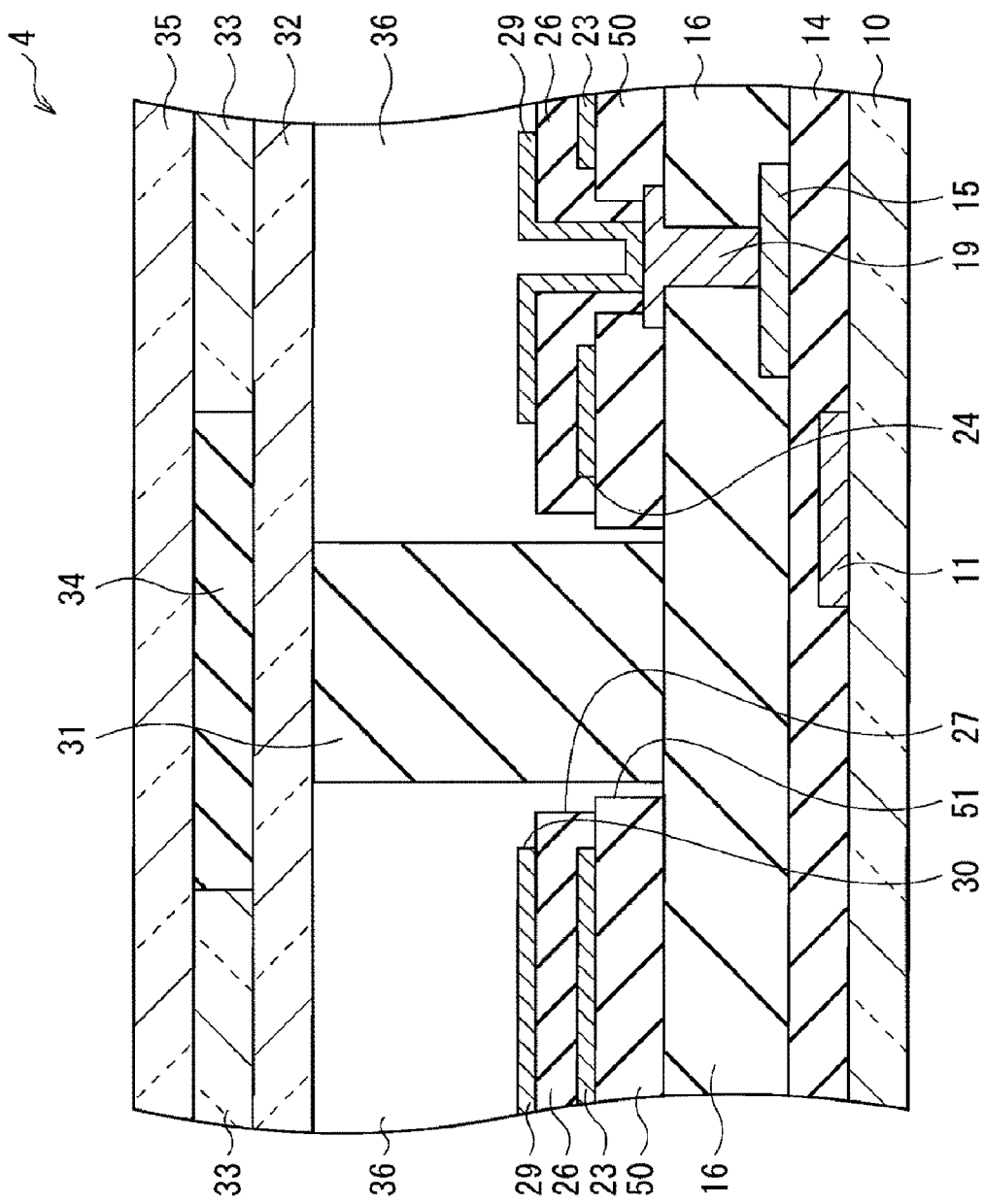
FIG. 10 is a cross section illustrating a structure of a main part of a liquid crystal display device according to a fourth embodiment.
Figure 11:
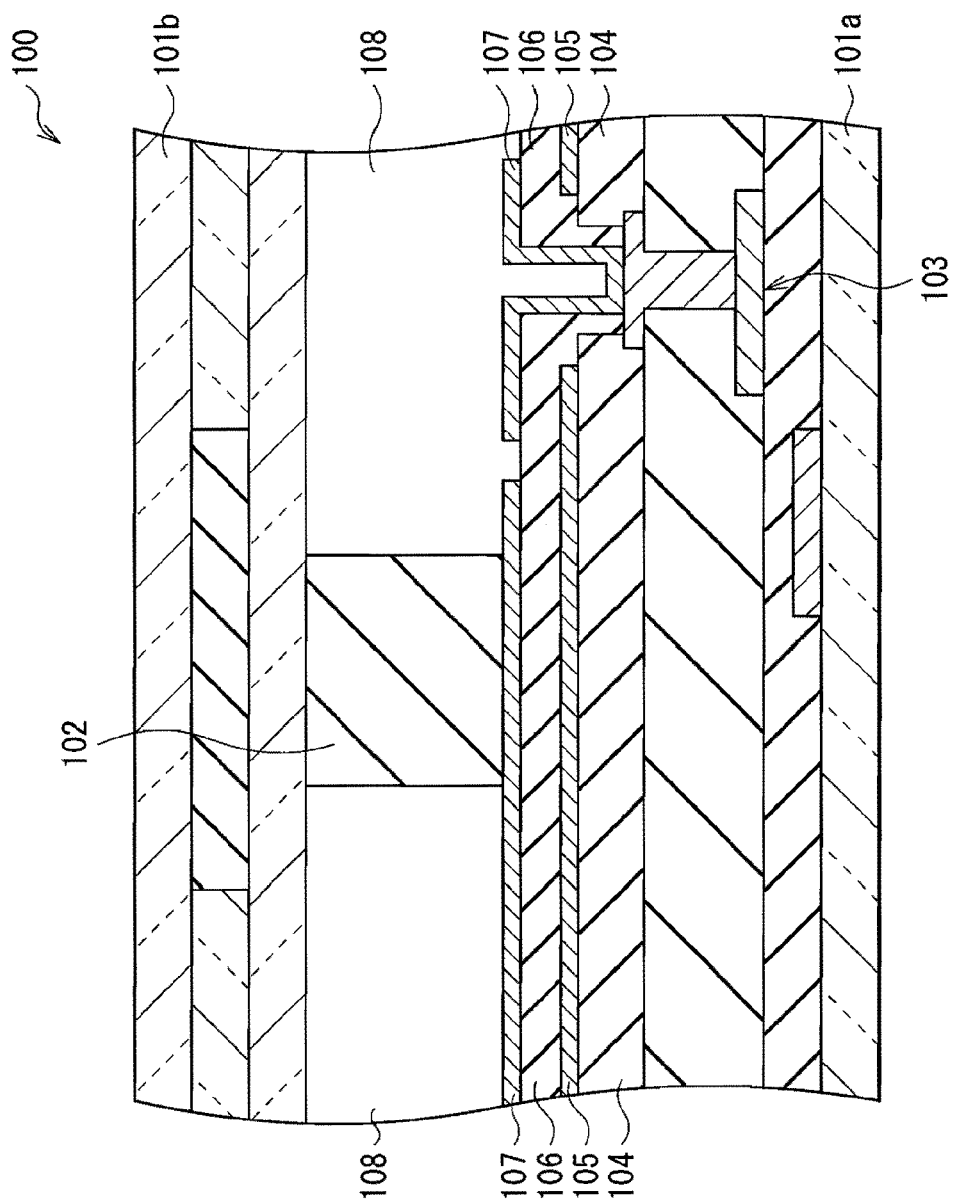
FIG. 11 is a cross section illustrating a structure of a main part of an existing liquid crystal display device in an FFS mode.
Figure 12:
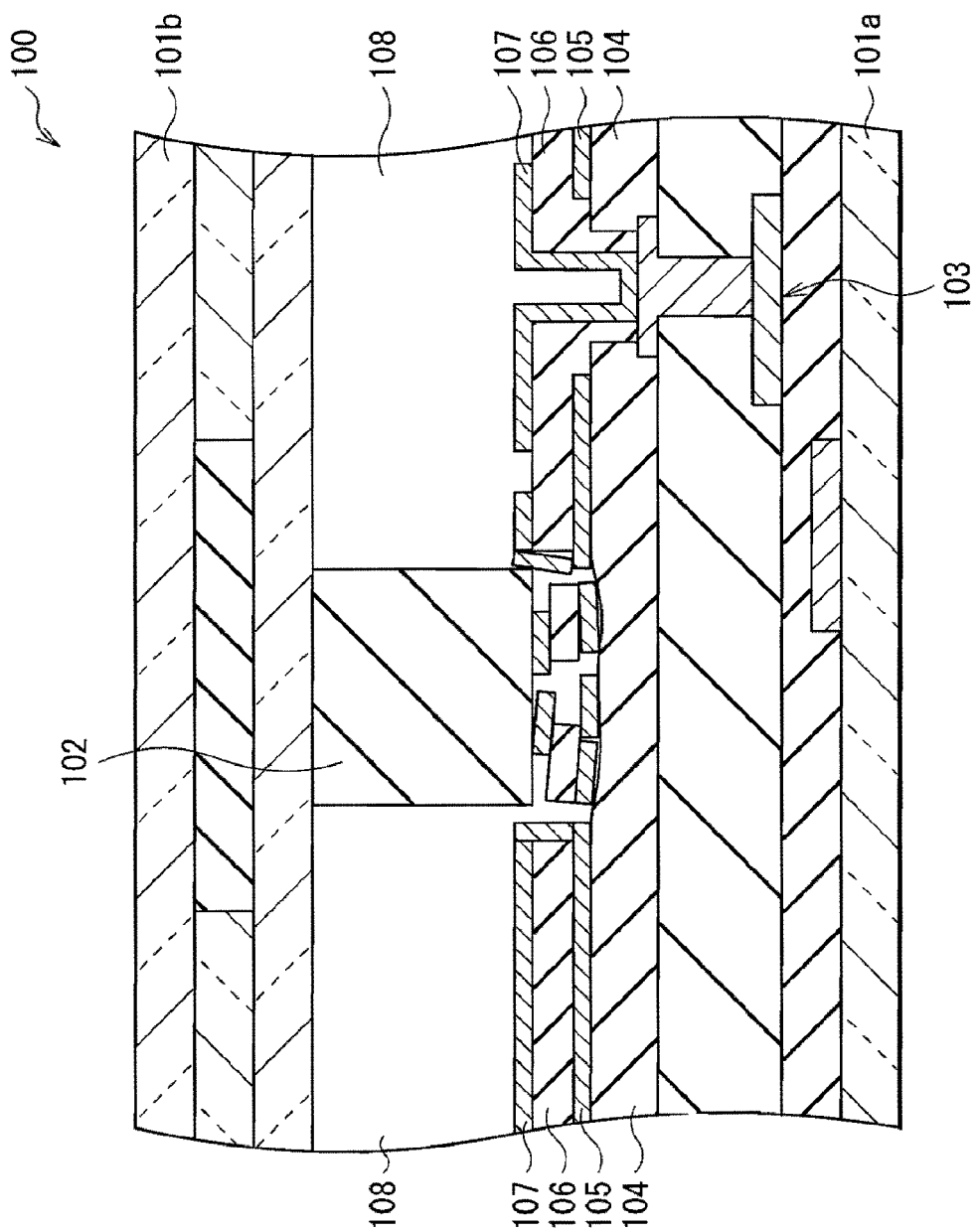
FIG. 12 is a cross section illustrating a state where a pixel electrode film, a pixel insulating film, and a common electrode film are broken in the liquid crystal display device illustrated in FIG. 11.

FIG. 10 illustrates a sectional configuration of the spacer 31 part in a liquid crystal display device 4 according to a fourth embodiment. The liquid crystal display device 4 is different from the liquid crystal display device 1 as the first embodiment, with respect to an interlayer insulation film 50. Specifically, in the liquid crystal display device 4, an interlayer insulation film hole 51 is formed in a region corresponding to the spacer 31 in the interlayer insulation film 50. The interlayer insulation film hole 51 is formed slightly larger than the plane size of the spacer 31 so that the spacer 31 passes therethrough, and is formed smaller than the common electrode film hole 24. As a result, the spacer 31 passes through the pixel electrode film hole 30, the pixel insulation film hole 27, the common electrode film hole 24, and the interlayer insulation film hole 51, and comes in contact with the top face of the transistor protection film 16. The other configuration is similar to that of the first embodiment (FIG. 3).

In the liquid crystal display device 4 having such a configuration, when a force is applied to the spacer 31 by pressure to the second glass substrate 35, the transistor protection film 16 is pressed. However, since the transistor protection film 16 is made of a hard material such as SiN, the transistor protection film 16 hardly deforms. In other words, since the interlayer insulation film 50 which deforms easily is eliminated, the strength against the pressure is increased to the maximum. Therefore, the occurrence of the pixel defect in the market is able to be reduced.

Although the present invention has been described above with reference to the exemplary embodiments, the present invention is not limited to the foregoing embodiments but may be variously modified. For example, the plane configuration of the spacer 31 is not limited to circle but may be other shape such as oval or quadrangle.

In addition, in the foregoing embodiments, the liquid crystal display device having only the display function has been described. However, the invention is not limited thereto. The invention is also applicable to a liquid crystal display device having therein a touch panel function having, for example, an image capturing function in addition to a display function. Such an device is formed with a plurality of photo sensors, such as PIN photodiodes, together with the TFT 13 on a side of a drive substrate for the liquid crystal (the first glass substrate 10 in FIG. 1), and captures an image of an object such as a finger touching the display screen to detect the object. Thereby, information such as position, size, shape and the like of the object is able to be inputted. Such an device is based on the assumption that the screen is frequently touched with a finger or the like, and in some cases, the screen is pressed considerably strongly. Therefore, it is very effective to apply the structure of the present invention to such an device in practice.

The present application contains subject matter related to that disclosed in Japanese Priority Patent Application JP 2008-217637 filed in the Japan Patent Office on Aug. 27, 2008, the entire content of which is hereby incorporated by reference.

Obviously many modifications and variations of the present invention are possible in the light of the above teachings. It is therefore to be understood that within the scope of the appended claims the invention may be practiced otherwise than as specifically described.

What is claimed is:

1. A liquid crystal display device comprising:
a first substrate having a common electrode film formed on a base insulation film and a pixel electrode film formed over the common electrode film via a pixel insulation film;
a second substrate disposed on a side of the pixel electrode film so as to face the first substrate;
a liquid crystal layer provided between the first substrate and the second substrate; and a spacer defining a distance between the first and second substrates, wherein,
either the common electrode film or the pixel electrode film or both of them are partly removed in a region corresponding to the spacer,
the pixel insulation film is partly removed in the region corresponding to the spacer
inside of a hole formed in the region in which the pixel insulation film and the common electrode film are partly removed is covered with the pixel electrode film, and
one of end faces of the spacer is in contact with the pixel electrode film at a bottom face of the hole.

2. A liquid crystal display device comprising:
a first substrate having a common electrode film formed on a base insulation film and a pixel electrode film formed over the common electrode film via a pixel insulation film;
a second substrate disposed on a side of the pixel electrode film so as to face the first substrate;
a liquid crystal layer provided between the first substrate and the second substrate; and
a spacer defining a distance between the first and second substrates, wherein,
both of the common electrode film and the pixel electrode film are partly removed in the region corresponding to the spacer,
the pixel insulation film is partly removed in the region corresponding to the spacer,
the base insulation layer is exposed at a bottom of a hole formed in the region in which the pixel electrode film, the pixel insulation film, and the common electrode film are partly removed, and
one of end faces of the spacer is in contact with the base insulation layer exposed at the bottom of the hole.

3. A liquid crystal display device comprising:
a first substrate having a common electrode film formed on a base insulation film and a pixel electrode film formed over the common electrode film via a pixel insulation film;
a second substrate disposed on a side of the pixel electrode film so as to face the first substrate;
a liquid crystal layer provided between the first substrate and the second substrate; and a spacer defining a distance between the first and second substrates, wherein,
both of the common electrode film and the pixel electrode film are partly removed in the region corresponding to the spacer,
the pixel insulation film is partly removed in the region corresponding to the spacer, and
the base insulation layer is also partly removed in the region corresponding to the spacer.

4. A liquid crystal display device comprising:
a first substrate having a common electrode film formed on a base insulation film and a pixel electrode film formed over the common electrode film via a pixel insulation film;
a second substrate disposed on a side of the pixel electrode film so as to face the first substrate;
a liquid crystal layer provided between the first substrate and the second substrate; and
a spacer defining a distance between the first and second substrates, wherein,
either the common electrode film or the pixel electrode film or both of them are partly removed in a region corresponding to the spacer,
the pixel insulation film is partly removed in the region corresponding to the spacer,
a common electrode film hole formed in the region in which the common electrode film is partly removed or a pixel electrode film hole formed in the region in which the pixel electrode film is partly removed is larger than a pixel insulation film hole formed in the region in which the pixel insulation film is partly removed, and
the relationship $d1 > t$ is satisfied, where "d1" is a distance from an edge of the common electrode film hole or the pixel electrode film hole to an edge of the pixel insulation film hole, and "t" is a thickness of the pixel insulation film.

* * * * *